US012469292B2

(12) United States Patent
Chawda et al.

(10) Patent No.: US 12,469,292 B2
(45) Date of Patent: Nov. 11, 2025

(54) SYSTEM AND METHOD FOR IMPLEMENTING A MULTIMODAL ASSISTANT USING LARGE LANGUAGE MODELS

(71) Applicant: KPMG LLP, New York, NY (US)

(72) Inventors: Viral Chawda, Frisco, TX (US); Charles Scott McAllister, Silver Spring, MD (US)

(73) Assignee: KPMG LLP, New York, NY (US)

( * ) Notice: Subject to any disclaimer, the term of this patent is extended or adjusted under 35 U.S.C. 154(b) by 350 days.

(21) Appl. No.: 18/205,698

(22) Filed: Jun. 5, 2023

(65) Prior Publication Data

US 2023/0326212 A1 Oct. 12, 2023

Related U.S. Application Data

(63) Continuation-in-part of application No. 17/659,286, filed on Apr. 14, 2022, now Pat. No. 11,941,902.
(Continued)

(51) Int. Cl.
*G06V 20/62* (2022.01)
*G06F 3/0484* (2022.01)
(Continued)

(52) U.S. Cl.
CPC ............ *G06V 20/50* (2022.01); *G06F 3/0484* (2013.01); *G06F 16/532* (2019.01); *G06F 40/40* (2020.01);
(Continued)

(58) Field of Classification Search
CPC ........ G06V 20/50; G06V 30/19; G06V 20/63; G06V 10/26; G06V 10/945; G06F 16/532; G06F 40/40; G06F 3/0484
See application file for complete search history.

(56) References Cited

U.S. PATENT DOCUMENTS 7,106,905 B2 9/2006 Simske
10,992,606 B1 4/2021 Mitchell
(Continued)

OTHER PUBLICATIONS

Y. Baek et al, Character Region Awareness for Text Detection, CVPR paper, 2019, pp. 9365-9374.
(Continued)

*Primary Examiner* — Gregory M Desire
(74) *Attorney, Agent, or Firm* — Hunton Andrews Kurth LLP

(57) ABSTRACT

An embodiment of the present invention is directed to a multimodal assistant for mechanics and technicians in military warehouses using large language models. An exemplary system provides a conversational assistant to mechanics and technicians working in challenging environments, such as shop or warehouse floors with heavy industrial equipment and componentry. The innovative system may utilize multimodal large language models as well as image segmentation techniques to efficiently retrieve relevant information from asset reference materials, documentation and other sources of instructional information. The system may also use multimodal large language models to extract information from the retrieved documents and/or other data sources to provide guidance on performing discrete tasks related to the asset, such as routine maintenance, part replacement, services and/or other related actions.

20 Claims, 11 Drawing Sheets

Related U.S. Application Data

(60) Provisional application No. 63/265,167, filed on Dec. 9, 2021.

(51) Int. Cl.
*G06F 16/532* (2019.01)
*G06F 40/40* (2020.01)
*G06V 10/26* (2022.01)
*G06V 10/94* (2022.01)
*G06V 20/50* (2022.01)
*G06V 30/19* (2022.01)

(52) U.S. Cl.
CPC .......... *G06V 10/26* (2022.01); *G06V 10/945* (2022.01); *G06V 20/63* (2022.01); *G06V 30/19* (2022.01)

(56) References Cited

U.S. PATENT DOCUMENTS

| | | |
|---|---|---|
| 11,049,063 B2 | 6/2021 | Ali et al. |
| 11,269,883 B2 | 3/2022 | Reed |
| 11,295,783 B2 | 4/2022 | Shen et al. |
| 11,550,299 B2 * | 1/2023 | Cella ................ G06Q 30/0206 |
| 11,580,348 B2 | 2/2023 | Volkerink et al. |
| 11,682,025 B2 * | 6/2023 | McLaney .......... G06Q 30/0185 705/4 |
| 12,001,917 B2 * | 6/2024 | Brebner .................. G06F 18/24 |
| 2009/0146832 A1 | 6/2009 | Ebert et al. |
| 2016/0069644 A1 | 3/2016 | Bell |
| 2018/0137349 A1 | 5/2018 | Such et al. |
| 2020/0311658 A1 | 10/2020 | Gundel et al. |
| 2020/0356254 A1 | 11/2020 | Missig et al. |
| 2021/0056499 A1 | 2/2021 | Jacobus et al. |
| 2021/0182773 A1 | 6/2021 | Padmanabhan |
| 2021/0248693 A1 | 8/2021 | Riland et al. |
| 2022/0230020 A1 | 7/2022 | Saeugling |
| 2023/0127525 A1 * | 4/2023 | Rai ....................... G06V 10/74 706/21 |

OTHER PUBLICATIONS

J. Baek et al, What is Wrong With Scene Text Recognition Model Comparisons? Dataset and Model Analysis, Clova AI Research, arXiv:1904.01906v4 [cs.CV] Dec. 18, 2019, pp. 1-19.

International Searching Authority, PCT Notification of the International Search Report and Written Opinion, International Application No. PCT/US22/51902, Mar. 7, 2023, pp. 1-15.

\* cited by examiner

SYSTEM AND METHOD FOR IMPLEMENTING A MULTIMODAL ASSISTANT USING LARGE LANGUAGE MODELS

CROSS REFERENCE TO RELATED APPLICATIONS

The application claims priority as a continuation-in-part application to U.S. patent application Ser. No. 17/659,286, filed Apr. 14, 2022, which claims priority to U.S. Provisional Application 63/265,167, filed Dec. 9, 2021, the contents of which are incorporated by reference herein in their entirety.

FIELD OF THE INVENTION

The present invention relates to systems and methods for implementing a multimodal assistant and more specifically to providing a conversational assistant to users, such as technicians, to efficiently and effectively service complex, unique and unconventional assets through image detection and recognition for identifiers associated with such assets.

BACKGROUND

Certain industries require unique and customized assets for various government and public health uses. Many of these assets are not tracked using common bar codes or serial numbers. Instead, such assets are identified through engraving, etching and other techniques for permanently carving on a hard surface.

In the defense and public health sectors, there are various types of assets that do not have an associated identifier. For example, defense or military assets may include weaponry, machinery and other components. Identifiers may be etched, embossed, printed or otherwise carved/fixed on the asset. In healthcare, medical devices in varying sizes and uses may be impacted. In addition, such assets may be considered highly sensitive, classified and/or otherwise restricted to the general public. Generally, there is a resistance to creating a new inventory of identifiers and then tagging such assets with the new identifiers. Currently, no viable solution is available to support these types of assets other than completely manual methods that involve a team of workers to manually read, log and confirm serial numbers. Moreover, given poor lighting and other difficult warehouse storage conditions, serial numbers may not be readily ascertainable on these unique assets.

It would be desirable, therefore, to have a system and method that could overcome the foregoing disadvantages of known systems.

SUMMARY

According to one embodiment, the invention relates to a computer-implemented system for providing a conversational assistant using multimodal large language models and computer vision neural networks performing image segmentation, text detection and text recognition. The system comprises: an interactive user interface that is configured to receive one or more inputs; a database interface that communicates with a database that stores and manages asset data; and a processor executing on a mobile device and coupled to the interface and the database interface, the processor further configured to perform the steps of: receiving, via the interactive user interface, a user query and a scan of an image associated with an asset; detecting, via a computer vision detection model, a text from the scan wherein the text is imprinted on the asset and the asset is a customized asset without a conventional serial number; performing, via a prediction model, text recognition of the text and identifying one or more predicted texts with corresponding confidence levels; displaying, via the interactive user interface executing on the mobile device, the one or more predicted texts comprising an asset identifier; identifying, via an asset lookup agent applying a segmentation model, a plurality of objects associated with the asset identifier wherein each object of the plurality of objects is fed to a lookup model to identify each object against an internal asset database; for a selected object, identifying, via the interactive user interface, a corresponding service action; retrieving, via a reference lookup agent, a set of reference data associated with the selected object; based on the identified service action and the selected object, generating, via an advice agent, a set of instructions and corresponding set of tools; and providing, via the interactive user interface, a response to the user query wherein the response comprises the set of instructions and the corresponding set of tools.

According to one embodiment, the invention relates to a computer-implemented method for providing a conversational assistant using multimodal large language models and computer vision neural networks performing image segmentation, text detection and text recognition. The method comprises the steps of: receiving, via an interactive user interface, a user query and a scan of an image associated with an asset; detecting, via a computer vision detection model, a text from the scan wherein the text is imprinted on the asset and the asset is a customized asset without a conventional serial number; performing, via a prediction model, text recognition of the text and identifying one or more predicted texts with corresponding confidence levels; displaying, via the interactive user interface executing on the mobile device, the one or more predicted texts comprising an asset identifier; identifying, via an asset lookup agent applying a segmentation model, a plurality of objects associated with the asset identifier wherein each object of the plurality of objects is fed to a lookup model to identify each object against an internal asset database; for a selected object, identifying, via the interactive user interface, a corresponding service action; retrieving, via a reference lookup agent, a set of reference data associated with the selected object; based on the identified service action and the selected object, generating, via an advice agent, a set of instructions and corresponding set of tools; and providing, via the interactive user interface, a response to the user query wherein the response comprises the set of instructions and the corresponding set of tools.

An embodiment of the present invention is directed to an asset identification system for unique assets in the defense, healthcare and other industries and environments that lack traditional serial numbers or identifiers. An embodiment of the present invention addresses challenges involving unique assets stored and managed in a warehouse or other setting. An embodiment of the present invention recognizes that certain unique assets do not have an associated tag, label or RFID that can be easily scanned. Current technology is unable to accurately and efficiently capture an identifier when it is engraved or embossed on an asset in a warehouse with challenging lighting conditions or other similar environment.

An embodiment of the present invention is directed to a conversational assistant for mechanics and technicians in military warehouses using large language models (LLMs). An exemplary system provides a conversational assistant to mechanics and technicians working in challenging environments, such as shop or warehouse floors with heavy industrial equipment and componentry. The innovative system utilizes multimodal large language models as well as image segmentation techniques to efficiently retrieve relevant information from asset reference materials, documentation and other sources of instructional information. The system may also use multimodal large language models to extract information from the retrieved documents and/or other data sources to provide guidance on performing discrete tasks related to the asset, such as routine maintenance, part replacement, services and/or other related actions.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
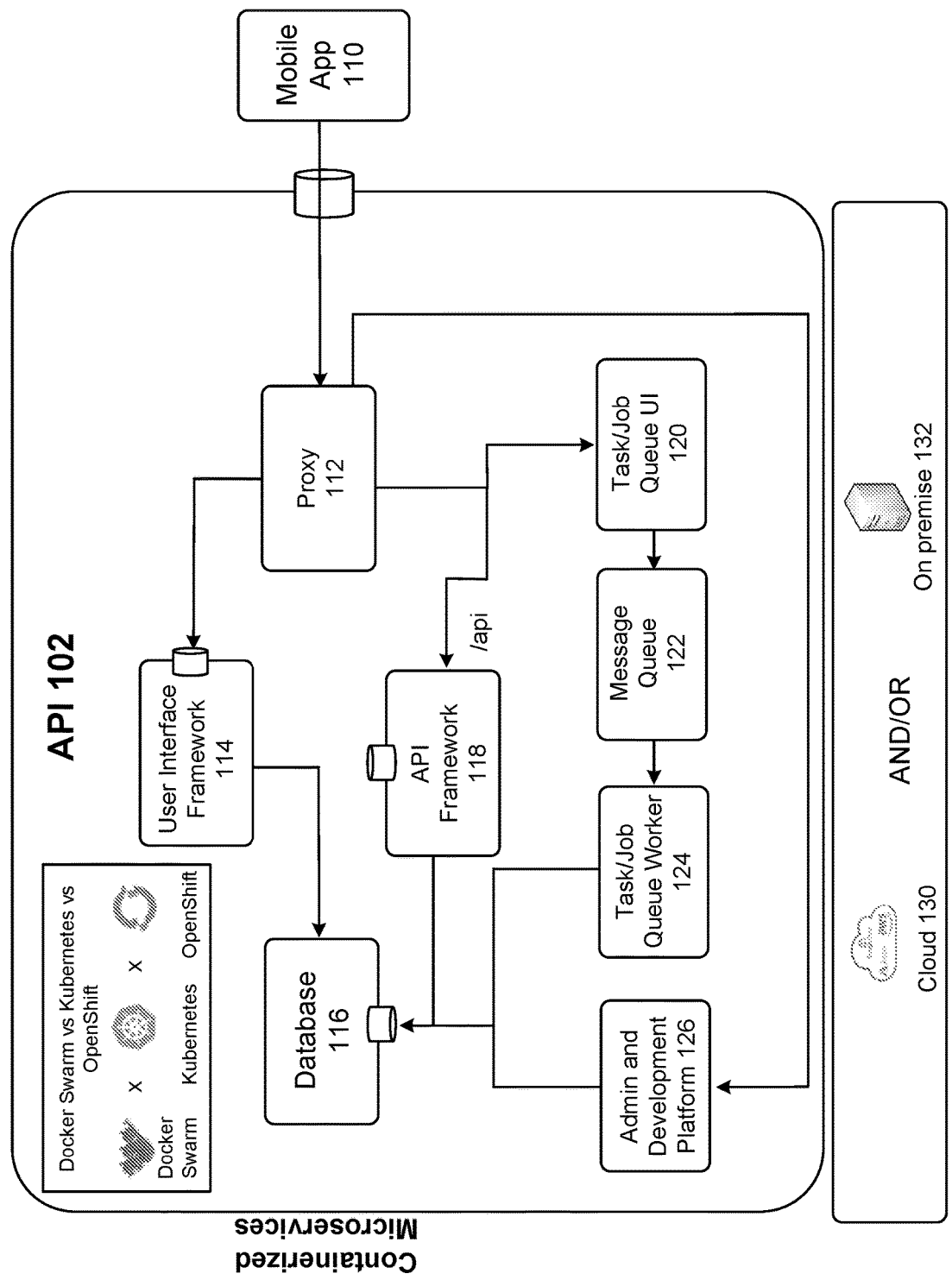
FIG. 1 is an exemplary flow diagram, according to an embodiment of the present invention.

Exemplary embodiments of the invention will now be described in order to illustrate various features of the invention. The embodiments described herein are not intended to be limiting as to the scope of the invention, but rather are intended to provide examples of the components, use, and operation of the invention.

An embodiment of the present invention is directed to a combination of two deep-learning computer vision models—customized with post-processing—wrapped in a mobile application (e.g., an Android application, etc.) that is backed by an Application Programming Interface (API) supporting concurrent mobile users to accomplish asset serialization tasks in a warehouse or other storage environment.

An embodiment of the present invention is directed to an asset identification system for unique assets in the defense, healthcare and other environments. Such assets are generally customized without traditional serial numbers or identifiers. Management of such unique assets may be associated with a legacy system or other back-end system, such as an enterprise resource planning (ERP) system.

An embodiment of the present invention is directed to identifying and recognizing serial numbers that are engraved, embossed, stenciled or otherwise imprinted on a unique asset. For example, an entity may manage various assets in a warehouse environment. An embodiment of the present invention is further directed to such assets in a warehouse setting with low lighting and other challenging conditions that make it difficult to ascertain such identifiers.

Assets may be considered sensitive in nature, especially in the defense and healthcare industries. Accordingly, there is a heightened need or urgency to accurately capture such assets and further identify location and other tracking information. In such instances, unique assets are not easily replaceable and therefore need to be accurately accounted.

Within the defense industry, exemplary assets may include weapons or weaponry of various sizes as well as other military machinery and components made specifically for defense and government use. Within the healthcare industry, exemplary assets may include non-traditional supplies that are made specifically for government, public health and/or other specialized use (as opposed to common retail products). Accordingly, such unique or customized assets do not have a traditional serial number or other identifier that can be easily scanned. In addition, there is no requirement to tag or add a RFID or other identifier. An embodiment of the present invention is directed to tracking assets without a traditional serial number or other tracking system or methodology in place.

Various factors contribute to the difficulty in accurately capturing identification information in unique assets. There is generally no uniformity in the type of imprinting or engraving. Different manufacturers may each apply different methods and types of imprinting, engraving, etc. The actual identifier may be of varying typeset, font size, color, placement, etc. In addition, such assets are generally stored and managed in challenging environments such as warehouses and storage units. For example, such environments are not well lighted and oftentimes there is little organization or order. Also, some assets are difficult to handle (e.g., rotate or move) due to size, sensitivity and/or limited access. Depending on the type of asset, other restrictions may be relevant.

An embodiment of the present invention is directed to creating a model, training the model and then deploying the model on a handheld mobile device. Accordingly, image and data processing may be performed on the edge by the mobile device where the mobile device computes and performs text detection and text recognition. For example, a user interface executing on a mobile device may be used to capture an image and identify a serial number or identifier.

According to an embodiment of the present invention, a user interface may provide a confirmation message and one or more possible results with a corresponding confidence level. Confidence level may represent a probability that the captured serial number is accurately captured or matches one on a predetermined list, such as a shipping document, inventory, etc. If the confidence is questionable, a human may be involved to verify or validate. Once verified or validated, the model may learn and further process asset data based on the human feedback.

The model training may involve identifying datasets representing examples of text and identifiers. An embodiment of the present invention may then fine-tune the datasets. This may involve taking images of actual assets with embossed, stenciled identifiers in warehouse conditions (e.g., bad lighting, etc.). The datasets may be refined by performing random augmentations during the model training process. This allows the datasets to have an infinite number of images to train the model. Augmentation may involve variations in the images such as varying degrees of rotations, addition of blur, image skew and/or contrast, applying pixilation, varying image sharpness, adding random geometric distortions, modifying or obscuring digits, etc. The augmentation performed may be catered to a particular use case, application and/or environment.

An embodiment of the present invention integrates two separate models that are stitched together with custom code. An output of a first model that performs text detection serves as input to a second model that performs recognition. In addition, an output of the second model may be based on user feedback (e.g., settings) and further subjected to post processing.

The second model that performs recognition may provide several different guesses/predictions ranked by confidence level. In this example, the end user may view multiple results. A number of configuration parameters may be applied to the prediction algorithm to vary the type of predictions that are generated and results that are displayed.

According to an embodiment of the present invention, post processing may involve detecting and recognizing serial numbers or other identifier candidates. In addition, heuristics may be applied to improve recognition and accuracy.

FIG. 1 is an exemplary architecture diagram, according to an embodiment of the present invention. An exemplary embodiment may include a mobile application 110 (e.g., an Android Application, written in Kotlin) that utilizes two deep-learning models to perform detection and recognition of unscannable serial numbers on assets.

According to an embodiment of the present invention, API 102 may represent a Docker-based suite of microservices, written in Python and TypeScript, that provides a Representational State Transfer Application Programming Interface (REST API) to a PostgreSQL database 116 that stores application data. Together, these services enable concurrent users of mobile application 110 as well as basic administrative features, such as user management. Being containerized, it may be deployable on-prem 132 or in-cloud 130, anywhere Docker is available as a container runtime.

Mobile Application 110 may communicate with Proxy 112 through which requests may be transmitted to User Interface Framework 114, API Framework 118, Task/Job Queue UI 120 as well as Admin and Development Platform 126. Other services may include Message Queue 122, Task/Job Queue Worker 124 and Database 116. Together, these services provide a backend data store to persist user actions on Mobile App 110, allowing concurrent users of the application to work on the same asset serialization tasks. These services also provide added administrative functionality for application admins.

Figure 2:
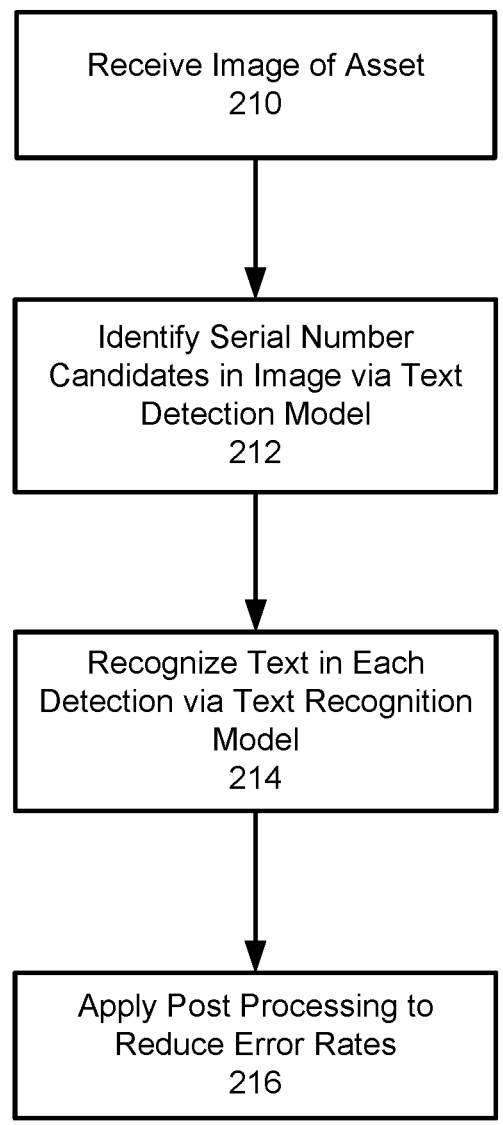
FIG. 2 is an exemplary flowchart, according to an embodiment of the present invention.

FIG. 2 is an exemplary flowchart, according to an embodiment of the present invention. At step 210, an image may be received. At step 212, a text-detection model may identify serial number candidates in the image of a given asset. At step 214, a text-recognition model recognizes the text in each detection. At step 216, a post-processing step is applied to reduce error rates by applying several heuristics against the first two steps' predictions. Other variations in implementation and design may be realized. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 210, an image may be received. The image may be scanned by a mobile device. In another example, a drone may capture images. A scanning structure may be used to capture images of assets as they are transported to a destination, such as a warehouse location. Other forms of image capture may be applied.

An embodiment of the present invention may be implemented in various configurations. In addition, configurations may be modified to support various assets, ranging from very small assets (e.g., microchips, etc.) to large assets (e.g., vehicles, machinery, etc.) of varying sizes, shapes, dimensions and types.

At step 212, a text-detection model may identify serial number candidates in the image of a given asset. According to an embodiment of the present invention, a text-detection model may represent a Python implementation of the open-source, MIT licensed Character Region Awareness for Text Detection (CRAFT) model.

At step 214, a text-recognition model recognizes the text in each detection. A text-recognition model may represent a Python implementation of an open-source, Apache 2.0 licensed scene text recognition model.

At step 216, a post-processing step is applied to reduce error rates by applying several heuristics against the first two steps' predictions. These heuristics may be enabled by a workflow provided by the user interface of a mobile application. Post-processing, as well as conversion of the text-detection model's output to input for the text-recognition model, may be applied independently of the open-source implementations of the model architectures. In addition, this post-processing may be customizable at runtime, allowing users of the model the fine-grain control needed to ensure accuracy on a variety of asset serialization tasks.

According to an exemplary illustration, deep-learning models may be compatible for using the models' frameworks' respective tools, PyTorch and TensorFlow Lite, which are licensed under a BSD 2.0 and Apache 2.0 licenses, respectively. Other implementations may be realized.

Figure 3:
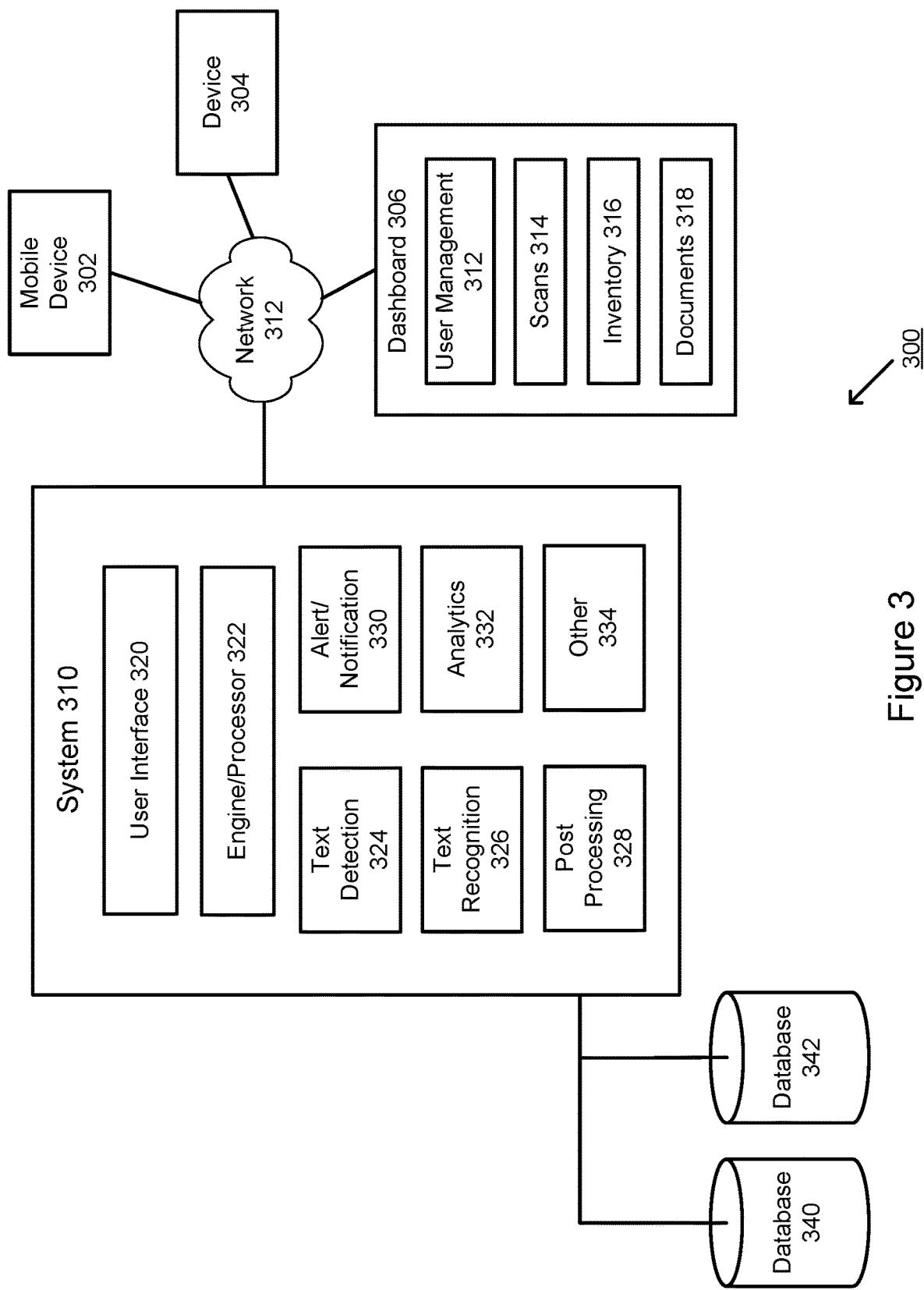
FIG. 3 is an exemplary system diagram, according to an embodiment of the present invention.

FIG. 3 is an exemplary system diagram, according to an embodiment of the present invention. System 310 executes and supports text detection and recognition through various configurations and architectures. Mobile Device 302 may communicate with System 310 via Network 312. In addition, Mobile Device 302 may be integrated with System 310 where processing occurs on the mobile device itself. System 310 may communicate and integrate with various other devices represented by 304 as well as dashboard interfaces represented by 306.

Dashboard 306 may provide functions relating to User Management 312, Scans 314, Inventory 316 and Documents 318. Dashboard 306 may include an interactive interface that provides functions and/or details relating to Scans (e.g., view scans, export scans), Inventory (e.g., view inventory, audit inventory, item view) and Documents (e.g., view documents, create documents, modify documents, etc.).

User Management 312 enables a user to manage user privileges, access, roles, etc. For example, an exemplary interface may include contact information (e.g., email, phone number, etc.); name (or other identifier); status (e.g., active); role/position (e.g., supervisor) and permissible actions. User Management 312 may also enable the creation, deletion and/or modification of users.

Scans 314 may relate to asset scans captured through various devices including mobile device, drones, scanning structures, etc. In addition, scans may be electronically imported from a source. For example, an image file from a warehouse may be used for text detection and recognition. Other scenarios may be supported. For example, users may view past scans and deep-learning model predictions to validate correct predictions and correct incorrect ones.

Inventory 316 may provide details relating to serial number, National Stock Number (NSN) (or other identifier), add status, quantity, place, location, sublocation, etc. Individual item details may be available through an item view. For example, details relating to an item may include Place, Location, Sublocation, Quantity, whether the item is an add or not.

Documents 318 may relate to shipping documents, inventory documents and/or other references. These documents may show their related items and completion status of the scan activity for each item.

System 310 may include User Interface 320 that supports various interactions on devices including mobile devices, other devices, computers, laptops, tablets, etc. User Interface 320 may enable users and/or other entities to interact with Engine/Processor 322. User Interface 320 may support various applications including browsers, mobile interfaces, dashboards, interactive interfaces, etc.

Engine/Processor 322 may support various functions and processes via modules including Text Detection 324, Text Recognition 326, Post Processing 328, Alert/Notification 330, Analytics 332, etc. Other functions and features represented by 334 may be supported in various forms and implementations.

Text Detection 324 may execute a text recognition model. Text Detection 324 may identify serial number candidates in the image of a particular asset or group of assets.

Text Recognition 326 may execute a text recognition model. Text recognition 326 may perform recognition and provide multiple results based on confidence level. In addition, various configuration parameters may be applied to the prediction algorithm to vary the type of predictions that are generated and results that are displayed.

Post Processing 328 may apply heuristics to improve recognition and accuracy.

Alert/Notification 330 may provide a communication relating to an event. This may include an unexpected event, such as missing assets, new or unexpected asset, etc.

Analytics 332 may track and analyze asset data. In addition, user activity may be tracked and managed. This may include user login, scanning data, images, model predictions, user feedback, location data, etc. Analytics 332 may also be used to validate and generate new datasets to train and refine models.

System 310 may store and manage data in various formats, including Databases 340, 342. Data may relate to assets, location information, shipping documents, warehouse data, etc. System 310 may be communicatively coupled to Databases 340, 342. Databases 340, 342 may include any suitable data structure to maintain the information and allow access and retrieval of the information. Databases 340, 342 may be any suitable storage device or devices. The storage may be local, remote, or a combination thereof with respect to Databases 340, 342. Databases 340, 342 may have back-up capability built-in. Communications with Databases 340, 342 may be over a network, or communications may involve a direct connection between Databases 340, 342 and System 310, as depicted in FIG. 3. Databases 340, 342 may also represent cloud or other network based storage.

Networks may be a wireless network, a wired network or any combination of wireless network and wired network. Although Network 312 is depicted as one network for simplicity, it should be appreciated that according to one or more embodiments, Network 312 may comprise a plurality of interconnected networks, such as, for example, a service provider network, the Internet, a cellular network, corporate networks, or even home networks, or any of the types of networks mentioned above. Data may be transmitted and received via Network 312 utilizing a standard networking protocol or a standard telecommunications protocol.

While FIG. 3 illustrates individual devices or components, it should be appreciated that there may be several of such devices to carry out the various exemplary embodiments. Users may communicate with various entities using any mobile or computing device, such as a laptop computer, a personal digital assistant, a smartphone, a smartwatch, smart glasses, other wearables or other computing devices capable of sending or receiving network signals.

The system 300 of FIG. 3 may be implemented in a variety of ways. Architecture within system 300 may be implemented as hardware components (e.g., module) within one or more network elements. It should also be appreciated that architecture within system 300 may be implemented in computer executable software (e.g., on a tangible, non-transitory computer-readable medium) located within one or more network elements. Module functionality of architecture within system 300 may be located on a single device or distributed across a plurality of devices including one or more centralized servers and one or more mobile units or end user devices. The architecture depicted in system 300 is meant to be exemplary and non-limiting. For example, while connections and relationships between the elements of system 300 are depicted, it should be appreciated that other connections and relationships are possible. The system 300 described below may be used to implement the various methods herein, by way of example. Various elements of the system 300 may be referenced in explaining the exemplary methods described herein.

An embodiment of the present invention may support a wide range of use cases and applications. For example, an employee in a warehouse may receive a shipment of assets with a shipping document that provides an inventory of the assets that were shipped. Current processes require a team of workers to open the shipment and then read and confirm asset serial numbers one by one where each serial number may include 20 or so random alphanumeric digits. In this exemplary scenario, the shipping document may contain a bar code that can be scanned. The bar code digitally embeds details relating to the assets, serial numbers, sender, instructions, etc. The shipping document may be used to cross-check and ensure that all the assets are properly received in the proper state or condition. With the mobile device or other instrument, a user may scan the assets. With each scan or set of scans, the system may present an identifier (or likely set of identifiers) which the user may accept or reject. The identifier may represent a prediction that can be further cross-referenced with the shipping document. If accepted, the mobile device may check off the corresponding item from the shipping document. The process may continue until all items listed on the shipping document are verified.

Information from the shipping document may be used to assist in the verification process. For example, a shipping document may identify asset characteristics which may be used to support low confidence assessments. If the shipping document indicates that the identifier is associated with a weapon, this additional information may be presented with the prediction to the user. In this example, if the user is scanning a weapon, the additional asset characteristics will improve the confidence level of the assessment.

A similar process or workflow may be applied to assets that are loaded for shipment or transit.

An embodiment of the present invention may be applied to an audit process to perform an inventory of assets maintained at a certain location. An embodiment of the present invention may integrate with a database that manages and stores asset location data. Granularity of asset location data may be as coarse or as fine as desired. The asset location data may be used for audit, validation, inventory and tracking purposes. For example, an embodiment of the present invention may track asset placement including a location on a particular shelf in a warehouse or other storage facility. In addition, other use cases may involve locating a specific asset, confirming a number of assets, confirming a location of assets for an upcoming delivery or other need, etc.

An embodiment of the present invention may be directed to asset authentication, security and/or other purposes. For example, an embodiment of the present invention may identify assets that are missing (e.g., identified in a shipping document but not scanned upon arrival), assets that were unexpected (e.g., an additional asset has been identified that was not listed in the shipping document) as well as compromised assets or other anomalies.

An embodiment of the present invention may provide an alert or other notification when an unexpected event has occurred, e.g., an unexpected asset has been identified, an asset is missing as well as other unexpected events. For example, an asset that is not on the shipping document may be identified as an "add." Based on this detection, an embodiment of the present invention may invoke a process to address the "add." This may involve tracking which entity sent the package, informing the entity and further investigating as to whether the shipping document was incorrect. According to another example, a missing item may be identified. In response, an embodiment of the present invention may generate an alert that an item on the shipping document has not been accounted for. Based on information in the shipping document, an embodiment of the present invention may notify the sender and generate a communication regarding the same.

Other information may be tracked and additional analysis may be performed. This information may be captured on the backend from the mobile device through an API and further communicated to a remote database system. Various types of user activity may be tracked and managed. This may include user login, scanning data, images, model predictions, user feedback, location data, etc. This information may also be used to validate and generate new datasets to train and refine models.

An embodiment of the present invention may support various user interfaces depending on the type of user, such as administrators, managers, supervisors, individual contributors, etc. For example, different user views may be applied through the mobile application. For example, an administrator role may provide a wide range of scanning data. A floor manager may view how team members and workers are performing. An embodiment of the present invention may be implemented through a web application executed on a browser. Other applications involving business intelligence, performance, and analytics may be captured. For example, inventory dashboards may be generated and provided which include data relating to various types of assets. A user may perform a search by using a set of factors, including serial numbers, asset types, locations, activity (e.g., all assets scanned on a particular day/time).

An embodiment of the present invention may support a learning component as well as a human in the loop for validation. This feature enables users to provide feedback in the form of validation to improve model accuracy and performance.

An embodiment of the present invention may be extended to verify authenticity of assets and identify counterfeit or suspicious assets. For example, irregular objects may be identified on a device or board. This may include an extra resistor, a misplaced component, improper logo or placement, an irregular shape, out of commission part, etc.

Figure 4:
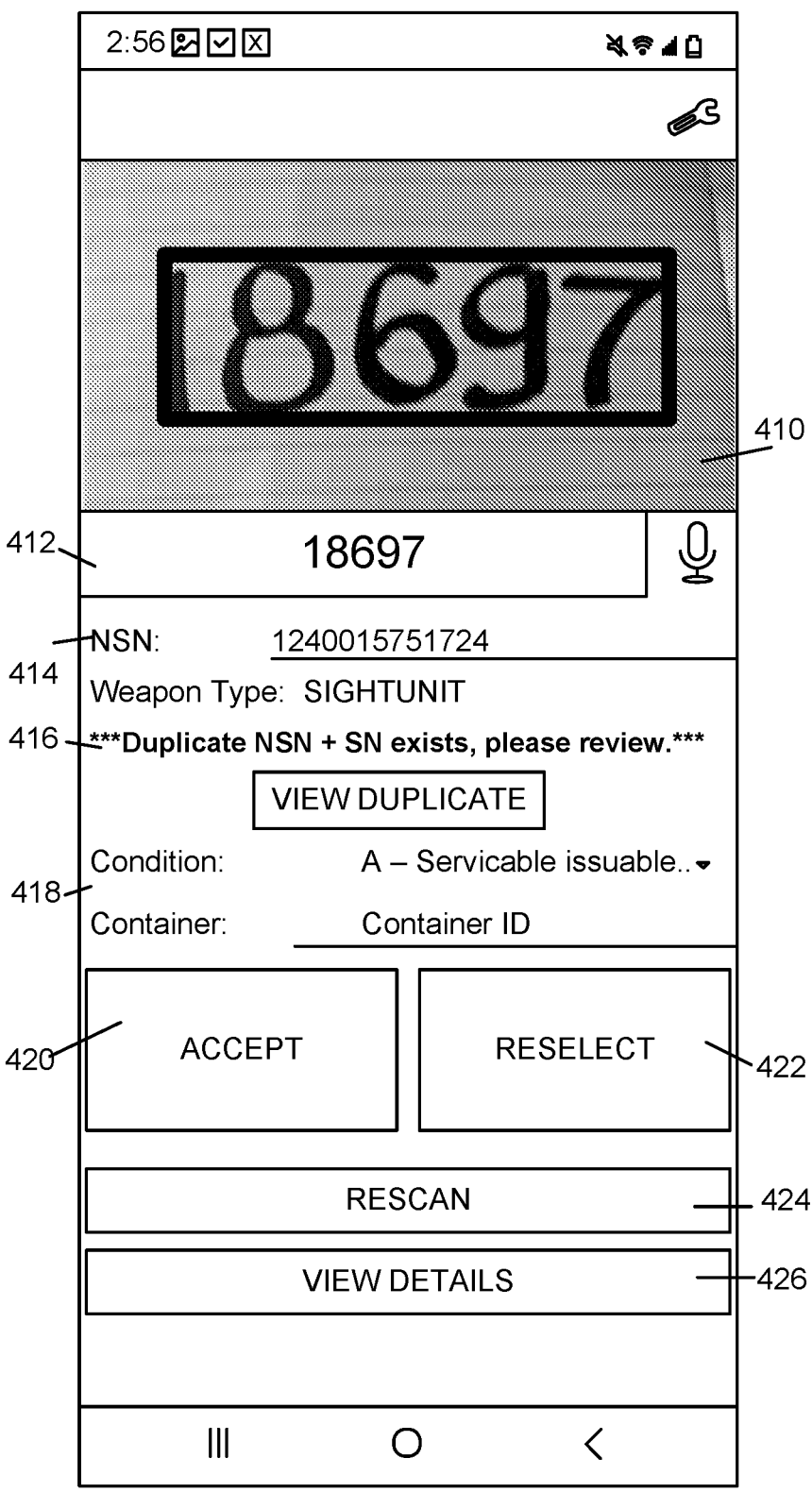
FIG. 4 is an exemplary user interface, according to an embodiment of the present invention.

FIG. 4 illustrates exemplary user interfaces displayed on a mobile device, according to an embodiment of the present invention. As shown in FIG. 4, a scan of an image has been captured at 410. User actions, such as correcting the scan with voice input, may also be captured by various icons. An embodiment of the present invention may display corresponding captured text (at 412) and other information associated with the captured text. This may include identifiers and other characteristics, at 414, 418. In addition, feedback indicating potential user error, such as duplicate scanning, may be shown at 416. A user may have a set of options, including Accept 420, Reselect 422, Rescan 424, View List 426, etc.

FIGS. 5-9 represent exemplary interfaces executing on a mobile device, according to an embodiment of the present invention.

Figure 5:
FIG. 5 is an exemplary user interface, according to an embodiment of the present invention.

FIG. 5 is an exemplary user interface, according to an embodiment of the present invention. FIG. 5 is a representative camera view for capturing asset identification markings. As shown in FIG. 5, the room in the image 510 may represent a default camera view when the application is running on an emulator, for example.

Figure 6:
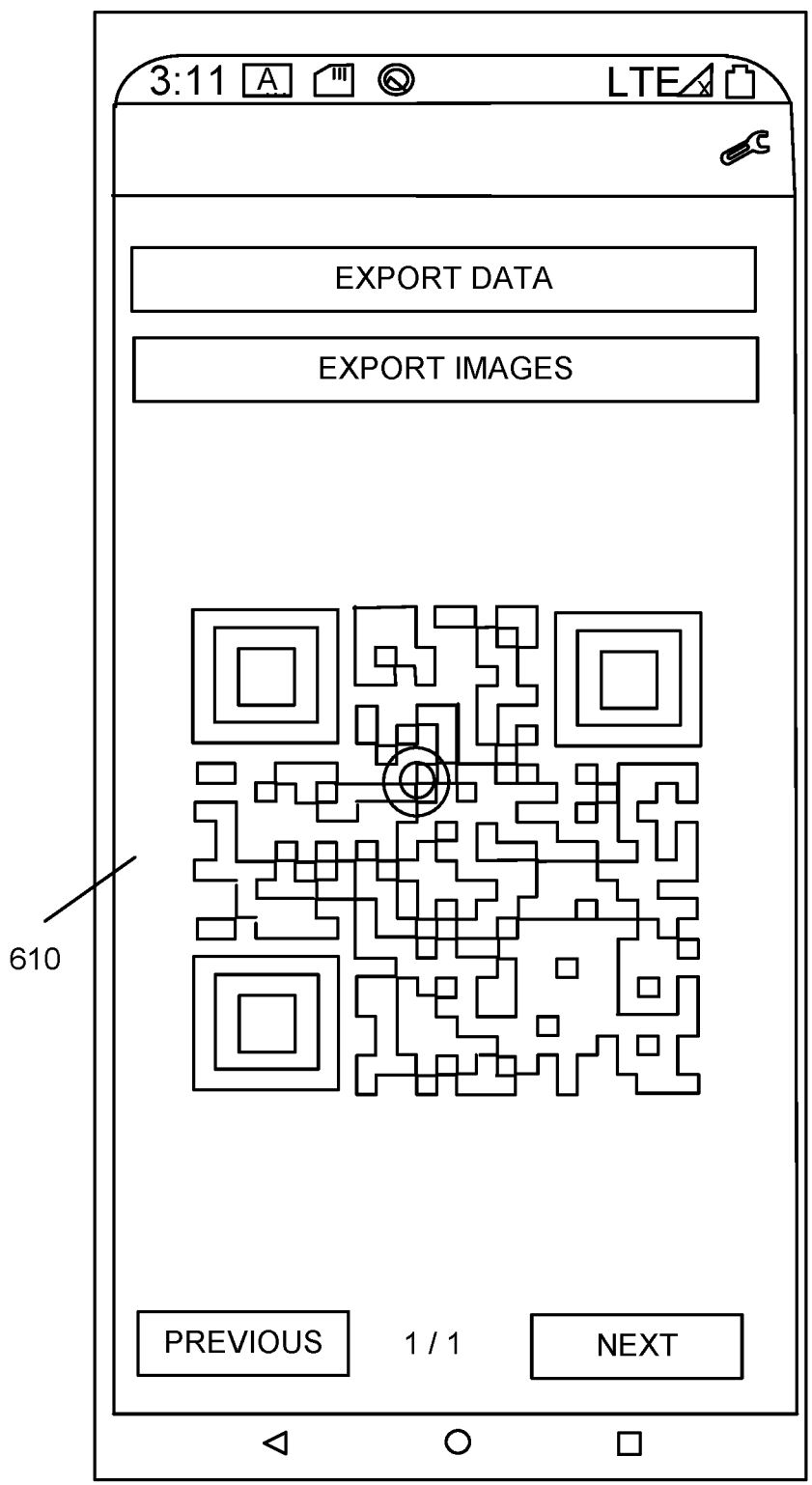
FIG. 6 is an exemplary user interface, according to an embodiment of the present invention.

FIG. 6 is an exemplary user interface, according to an embodiment of the present invention. FIG. 6 illustrates how data can be imported and/or exported. In this example, FIG. 6 illustrates a scanned QR code 610. Other codes and/or images may be captured for import. For example, the QR code 610 may represent a shipping document or other source of asset information that may be used to cross-check and/or otherwise verify asset data. FIG. 6 also illustrates how data may be exported as data and/or images.

Figure 7:
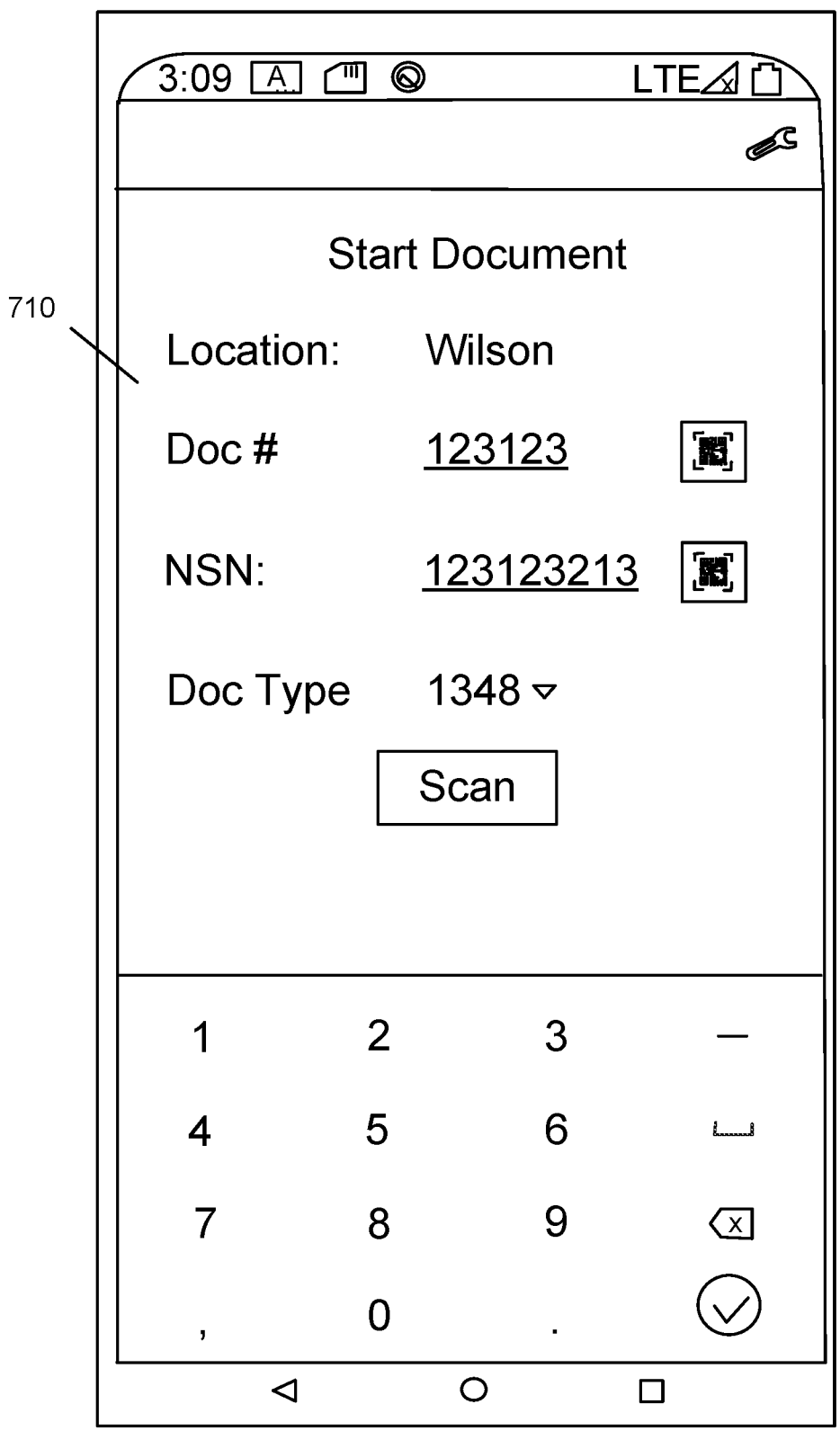
FIG. 7 is an exemplary user interface, according to an embodiment of the present invention.

FIG. 7 is an exemplary user interface, according to an embodiment of the present invention. FIG. 7 illustrates how shipping documents may be created. As shown by 710, a location may be identified. Other data may include document number, NSN, document type, etc. A user may manually enter the identifiers and/or scan an image.

Figure 8:
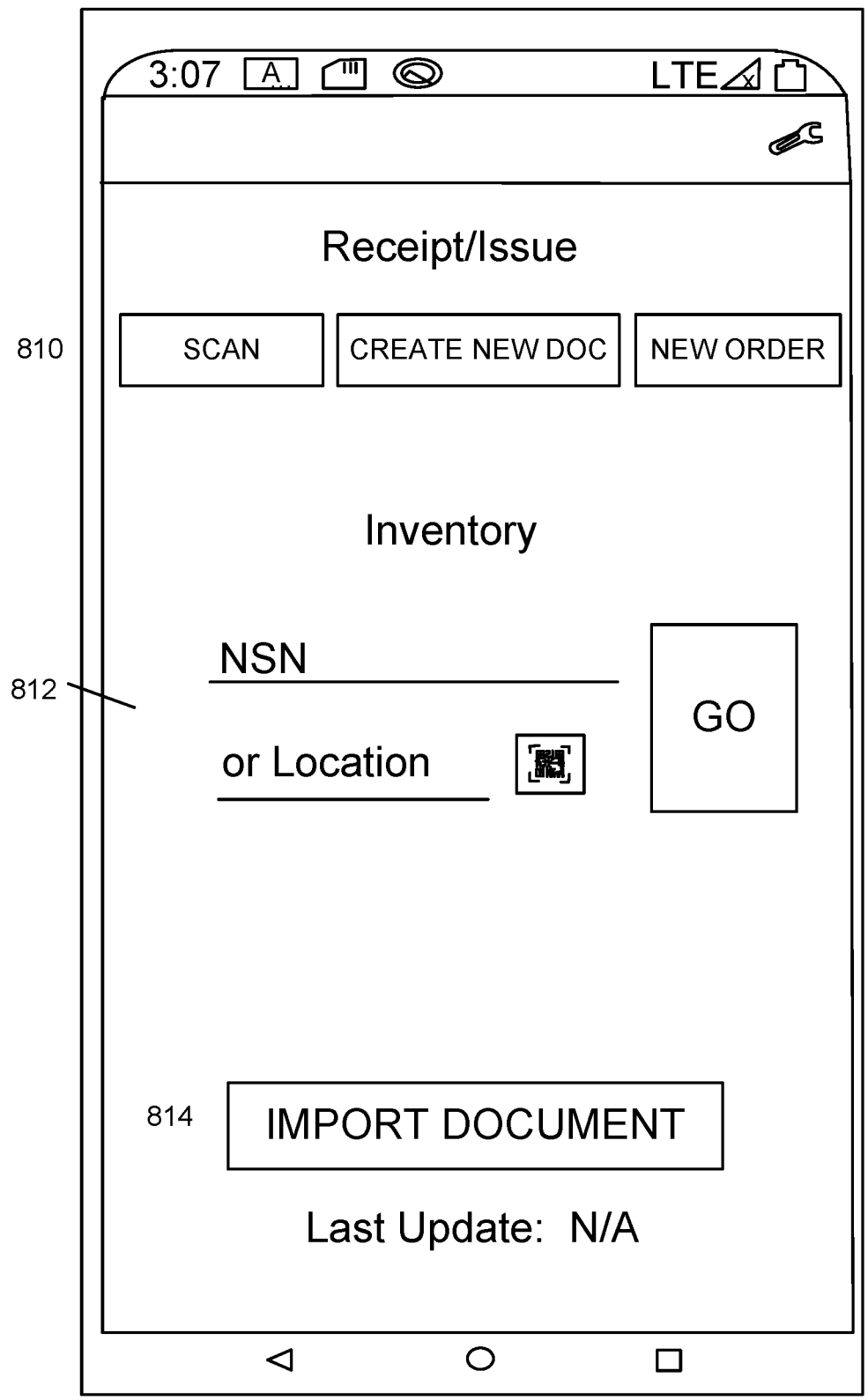
FIG. 8 is an exemplary user interface, according to an embodiment of the present invention.

FIG. 8 is an exemplary user interface, according to an embodiment of the present invention. FIG. 8 illustrates how shipping documents may be imported. At 810, a user may scan a document, create a new document and initiate a new order. As shown at 812, a QR code may be scanned. Other user inputs may be supported. Document import may be initiated at 814.

Figure 9:
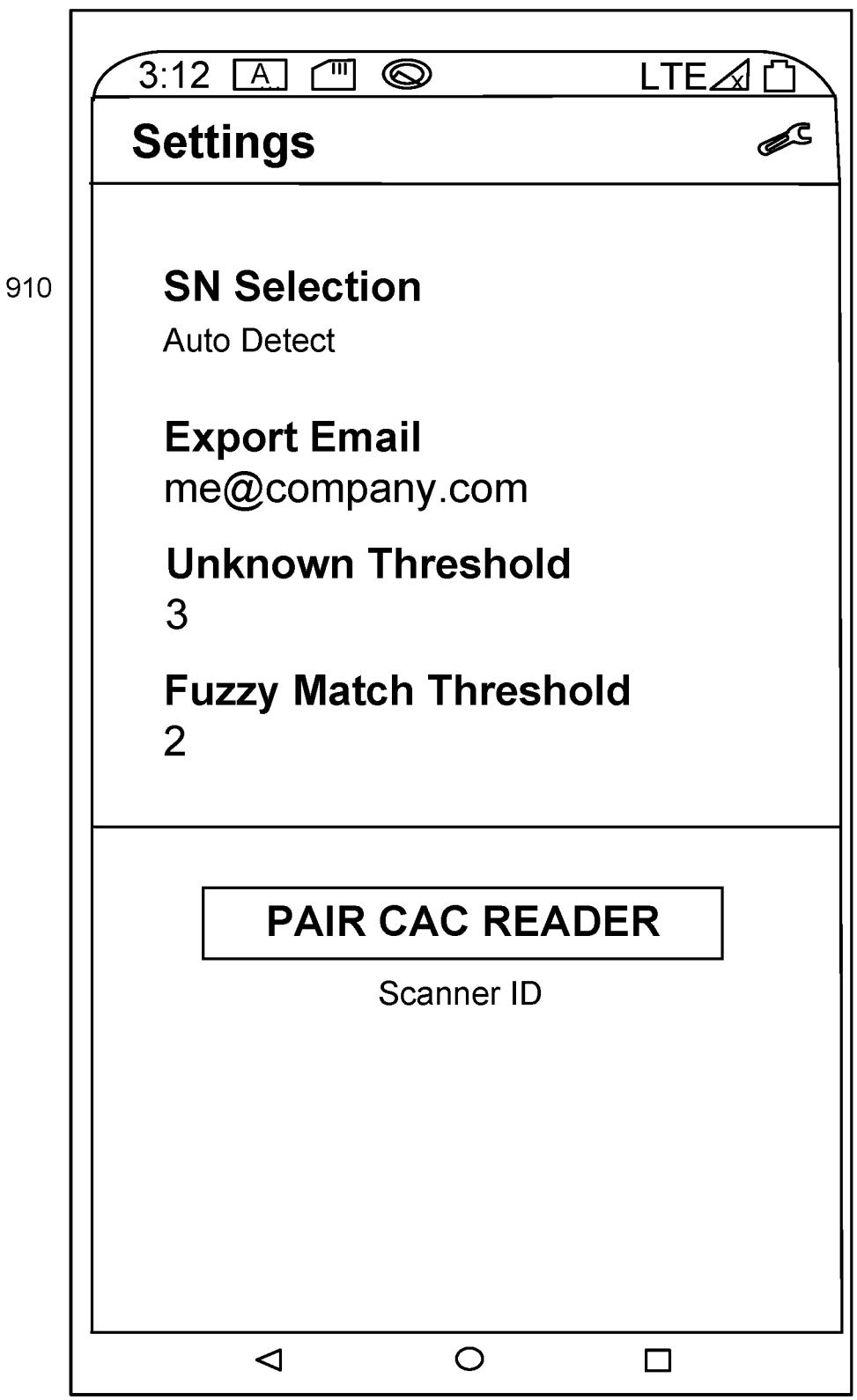
FIG. 9 is an exemplary user interface, according to an embodiment of the present invention.

FIG. 9 is an exemplary user interface, according to an embodiment of the present invention. FIG. 9 illustrates deep-learning model customizations that a user may configure at 910. FIG. 9 also illustrates how a user may pair a government-issued CAC card with the application to login. Other cards, equipment, and/or devices may be identified and paired.

The user interfaces are exemplary only; other variations and modifications may be realized for various use cases and applications.

An embodiment of the present invention recognizes that certain users, such as mechanics and technicians, face significant challenges in maintaining and repairing large and expensive assets, especially those that include complicated componentry that may deviate from original equipment manufacturer (OEM) builds. These assets are highly complex and oftentimes unique (e.g., one of a kind or limited), with numerous parts and components that require specialized knowledge and expertise to properly and efficiently repair, service and maintain. Traditional methods of informational retrieval, such as reading lengthy product manuals, can be time-consuming and error-prone, especially for more novice or general technicians that are not as well-versed in finding and using the asset's reference material.

An embodiment of the present invention is directed to a conversational assistant for mechanics and technicians in military warehouses using large language models (LLMs) and image segmentation models. An exemplary system provides a conversational assistant to mechanics and technicians working in challenging environments, such as shop or warehouse floors with heavy industrial equipment and componentry. The innovative system may utilize multimodal large language models as well as image segmentation techniques to efficiently retrieve relevant information from asset reference materials and/or other documentations and sources of instructional information. For example, the system may also use multimodal large language models to extract information from the retrieved documents and/or other data sources to provide guidance on performing discrete tasks related to the asset, such as routine maintenance, part replacement, services and/or other related actions.

According to an embodiment of the present invention, a system model uniquely fine-tunes on domain-specific data and provides conversational utility through integrations leveraging Application Programming Interfaces (APIs) that perform pre-processing of model inputs and post-processing of model outputs that may depend upon the state of a system's databases. The system may also include safeguards against hallucinations, using Reinforcement Learning from Human Feedback (RLHF) to ensure that the information provided to the user is increasingly accurate and reliable. In addition, the system may be designed to be used on rugged devices suitable for a blue-collar work environment. Other applications, user cases, environments, and industries may be supported.

For example, an embodiment of the present invention may be applied to a military warehouse setting. In this example, large complex machinery, e.g., tanks, weapons, etc. may be transported to a military warehouse for various actions including service, maintenance, repair, etc. Services may occur on a periodic basis; maintenance may be based on manufacturer guidelines and repairs may be a result of an issue detected during operation.

Generally, military warehouses are limited in space due to the size of complex machinery. For example, a military warehouse may have space to service 2-4 large machineries at one time. Each machinery may include a myriad of components that vary in complexity and type, e.g., electronics, mechanical parts, software modules, classified/sensitive data, etc. In addition, some of the components may require a level of expertise and/or set of tools to properly perform a certain service or action.

At any given time, there may be available technicians/mechanics of varying skill level and expertise, ranging from general knowledge to technology expert. When a machinery is transported to a military warehouse, a technician or team of technicians may be tasked with disassembling the machinery for repair, service, maintenance, etc. Upon disassembling, the technician may then determine what components need to be addressed, etc. Depending on the action, the technician may then need to consult reference materials as well as senior engineers to perform the necessary action with an appropriate set of tools and resources (e.g., materials, data, etc.). A particular sequence of actions may need to be followed in a specific order. For example, some tasks may not proceed before other tasks. Other restrictions and guidelines may be implemented.

There may be instances where the instructions are not readily available, outdated and/or difficult to understand. Also, if a tool or an expert with a specific skillset is not available, the technician is unable to complete the task. This may be recognized after the complex machinery has been disassembled in a warehouse. In this example, the limited warehouse space is now occupied longer than expected. Such delays lead to significant inefficiencies and wasted resources including cost and valuable time.

An embodiment of the present invention integrates Generative AI to identify patterns and structures to generate responses in context, e.g., based on prior responses and questions. Accordingly, a general technician with access to timely information and clear guidance can perform actions on a wide range of components for complex assets. This avoids having to schedule a particular expert with limited availability. However, when a technician with particular experience or expertise is needed, an embodiment of the present invention may integrate the specific technician in an optimal manner through intentional scheduling to avoid disruptions in a workflow.

An embodiment of the present invention is directed to integrating technician feedback to a data corpus to further improve accuracy and relevancy. Here, the system learns from user interaction, prior technician experience, real-time updates to documentation, available resource materials, etc.

An embodiment of the present invention may also consider relevant skill and experience level of a technician or team of technicians. For example, instructions may be customized to a particular technician based on expertise level, experience, familiarity, etc. If a technician is familiar with a particular component, instructions may be streamlined while more details may be provided to a general or new technician with little to no prior experience. In another example, the system may provide a recommendation for a particular technician or identify technician attributes to efficiently perform a task or an action in a sequence. An embodiment of the present invention may provide standardized prompts based on various factors, including asset type, technician level, and/or other considerations.

Figure 10:
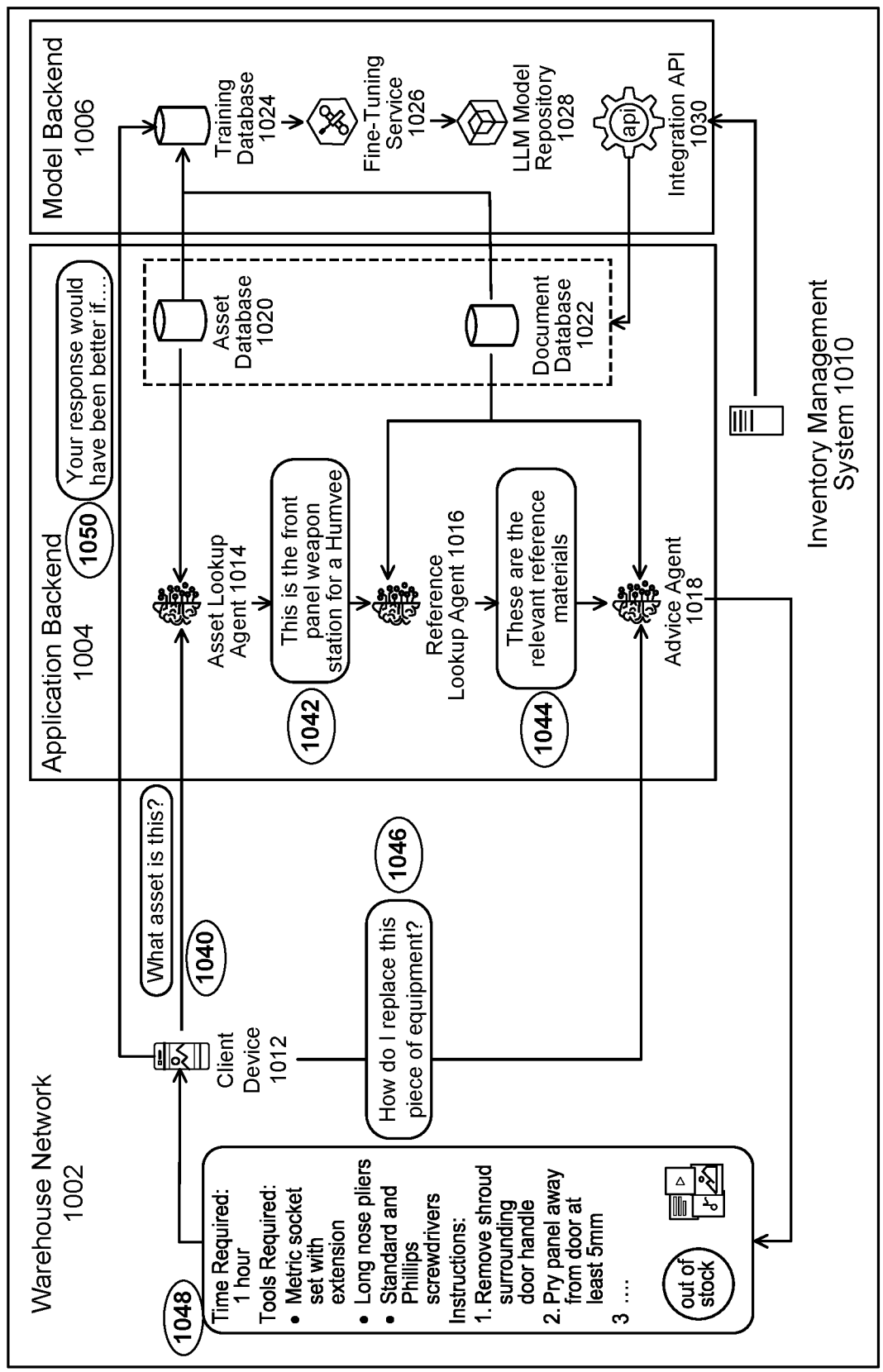
FIG. 10 is an exemplary system diagram, according to an embodiment of the present invention.

FIG. 10 is an exemplary system diagram, according to an embodiment of the present invention. FIG. 10 illustrates a Warehouse Network 1002, Application Backend 1004 and Model Backend 1006.

As shown in FIG. 10, Warehouse Network 1002 may support client interaction through client device 1012. Application Backend 1004 may support various agents, including Asset Lookup Agent 1014, Reference Lookup Agent 1016 and Advice Agent 1018. Sources of data may include Asset Database 102 and Document Database 1022. Model Backend 1006 may support Training Database 1024, Fine-Tuning Service 1026, LLM Model Repository 1028 and Integration API 1030.

While FIG. 10 illustrates individual devices or components, it should be appreciated that there may be several of such devices or components to carry out the various exemplary embodiments. In addition, devices or components may be combined and/or consolidated as well as further separated and distributed. The system diagram is meant to be exemplary and non-limiting. For example, while connections and relationships between the elements are depicted, it should be appreciated that other connections and relationships are possible.

An embodiment of the present invention is directed to integrating into a client's backend resource planning application for real-time updates to inventory and status. According to an exemplary scenario, the system may integrate with pre-existing inventory management systems, as shown by 1010, through an Integration API 1030 to discover, assess, and/or ingest asset and related document data for a client. This data may be used to customize the large language models backing the Asset Lookup Agent 1014, Reference Lookup Agent 1016, and Advice Agent 1018 through a fine-tuning service, shown by 1026. This results in new models that are tailored to the specific client.

As a user (such as a mechanic or technician) works on a part of a complex machinery, the user may need instructions on how to service a specific component. An embodiment of the present invention provides relevant and timely instructions, e.g., step-by-step guide, videos, audio, images, diagrams, etc., to the user. The instructions may also recommend a set of tools to perform the servicing. With this capability, an embodiment of the present invention may recognize that a tool from vendor A is needed to perform the servicing and then determine whether the tool from Vendor A is accessible or available in inventory. The tool from Vendor A may be identified and an exact location may be provided. The user may retrieve the tool or a request for the tool may be submitted. If the tool from Vendor A is not available, an embodiment of the present invention may identify a substitute, such as an equivalent tool from Vendor B. In addition, an embodiment of the present invention may recommend that a component be replaced or repaired and accordingly determine a cost effective and efficient option by considering various factors, such as inventory, status, cost/time of repair, cost/time of replacement, etc.

An embodiment of the present invention may support a user interface that allows various users, such as mechanics and technicians, to interact with the system using multimodal queries—including voice, video, image, text, etc. For example, a client device 1012 may include a user interface to receive queries in various formats. The client device may represent a mobile device, tablet, smart device, computer processor, terminal, kiosk, etc. Other devices may include ruggedized tablets or mobile phones that can withstand harsh conditions and be used while on their feet. The system may be designed to be highly responsive, providing real-time feedback to the user as they enter their queries and interact with the system. Additionally, the system may include databases, e.g., Asset Database 1020, Document Database 1022, etc., that store and manage product manuals and other relevant information, such as an inventory of warehouse assets, which may be continuously updated via the Integration API 1030 to ensure that the information provided to the user is up-to-date and accurate. Other sources of data, internal and/or external, may be integrated and accessed.

An embodiment of the present invention is directed to understanding user queries about a physical asset and identifying an asset using a multimodal large language model designed to identify and classify specific parts and components associated with the asset. Asset Lookup Agent 1014 may identify physical assets through fine-tuning on training data, as shown by 1026, that serves as a digital twin of a warehouse's inventory in the system's asset and training databases, as shown by Asset Database 1020 and Training Database 1024. Asset Lookup Agent 1014 may rely on pre-processing of user queries so that agent prompts may be consistently and optimally engineered for the lookup task regardless of variations in the user's natural language prompt.

For example, a client device 1012 may input a query about an asset, such as "what asset is this?" (as shown by 1040). Asset Lookup Agent 1014 may identify the asset, through an image or descriptor, as a particular component for an asset. For example, Asset Lookup Agent 1014 may identify the asset as "This is the front panel weapon station for a Humvee" (as shown by 1042). Within a military warehouse setting, the assets including weaponry, tanks and complex machinery generally do not have common serial number or tag that can be scanned for security reasons. RFID tags may be vulnerable to being intercepted, altered or otherwise tampered with. Accordingly, the client device 1012 may receive an image of the asset for asset identification.

Once the system has identified the asset, the UI layer of the system provides users with an opportunity to provide error-correcting feedback. When the user accepts the lookup, the system may use another multimodal large language model, e.g., Reference Lookup Agent 1016, to retrieve the asset's relevant reference material, which may include manuals, guides, and other documents from the system's Document Database 1022 and/or other data source. The reference materials, such as documents, may be related to the asset in question both directly (e.g. when the documents pertain directly to the asset) as well as indirectly (e.g. when an asset's componentry deviates from OEM builds, due to the agent's neural network being auto-regressive). In this example, the system responds with "These are the relevant reference materials" as shown by 1044.

The system may also use a multimodal large language model designed to respond to requests specific to the identified asset, such as providing step-by-step instructions for certain tasks, such as repair and maintenance of the asset. For example, the user through client device 1012 may ask "how do I replace this piece of equipment?" (as shown by 1046). In response, the system may provide detailed instructions, as shown by 1048. The instructions may include an estimation of resources, e.g., time, number of technicians, warehouse space, tools, etc. When specific tools are recommended, the system may also identify availability, status, cost, etc. And if tools are not currently available, substitute and/or equivalents recommendations may be provided. An updated set of instructions may be provided if the technician chooses to use a substitute tool. In some instances, engineer approval may be required for a deviation in the workflow (e.g., substitute tool, additional parts, etc.). The approval may be automatically generated and added to the workflow. Information shown by 1048 may include multimedia, e.g., video, audio, images, reference material, tutorials, prior technician comments, etc. For complex actions, an embodiment of the present invention may recommend additional technicians for assistance. And if an action has been expedited, an embodiment of the present invention may coordinate a team of technicians to work on different components and perform various actions on a particular asset. For example, technician A may work on a front panel while technical B works on a back panel. Other actions that may be dependent on the front panel or back panel may be scheduled at a later time. Accordingly, an embodiment of the present invention supports individual work as well as collaborative teamwork.

An embodiment of the present invention may also support an administrator view that manages various tasks performed on an asset as well as a fleet of assets. This enables an administrator to manage technicians, inventory, tools, work progress, scheduling, etc.

As with the Asset Lookup Agent 1014, the input of Advice Agent 1018 may be pre-processed to engender model outputs in an instructional format, such as step-by-step, chain-of-thought instructions. The output of Advice Agent 1018 may be further augmented with post-processing algorithms that combine text, images and/or videos related to the asset from the system's databases into various outputs, including rich media outputs that provide detailed and easy-to-follow instructions to the user. The application's UI layer may visually organize the media output in an intuitive, easy-to-follow way. The Advice Agent 1018 may further enrich the output by cross-referencing materials deemed to be required for the task with the users' external Inventory Management System 1010 in order to make more accurate estimates on the time and/or resources involved in completing the task. For example, if a part required for performing the task is out-of-stock, the user may be notified of this fact in the UI layer.

To ensure the reliability of the information provided to the user, an embodiment of the present invention may include safeguards against hallucinations, such as a user feedback mechanism that allows users to report any errors or inaccuracies they encounter while using the system, as shown by 1050. This feedback may be saved to Training Database 1024 and used to continuously improve the accuracy and reliability of the system using Reinforcement Learning from Human Feedback (RLHF) in the system's Fine-Tuning Service 1026. In this approach, user feedback may be used to fine-tune a reward model capturing user preferences. As the system develops more refined reward models through the collection of user feedback, copies of the initial multimodal large language models may have some of their parameters fine-tuned through a policy-gradient reinforcement learning (RL) algorithm, such as Proximal Policy Optimization (PPO). RLHF may continue throughout the application's life with iterative, user-driven updates to the reward model and the policy together. As the RL policy updates, system users may continue ranking these outputs versus the system's earlier model versions.

An embodiment of the present invention may include data privacy safeguards to protect asset information. Data may be encrypted both in transit and at rest to prevent unauthorized access. The system may also implement user authentication and access controls to ensure that only authorized users have access to the information. Moreover, the system may operate within any network, including air-gapped environments lacking public internet access.

Figure 11:
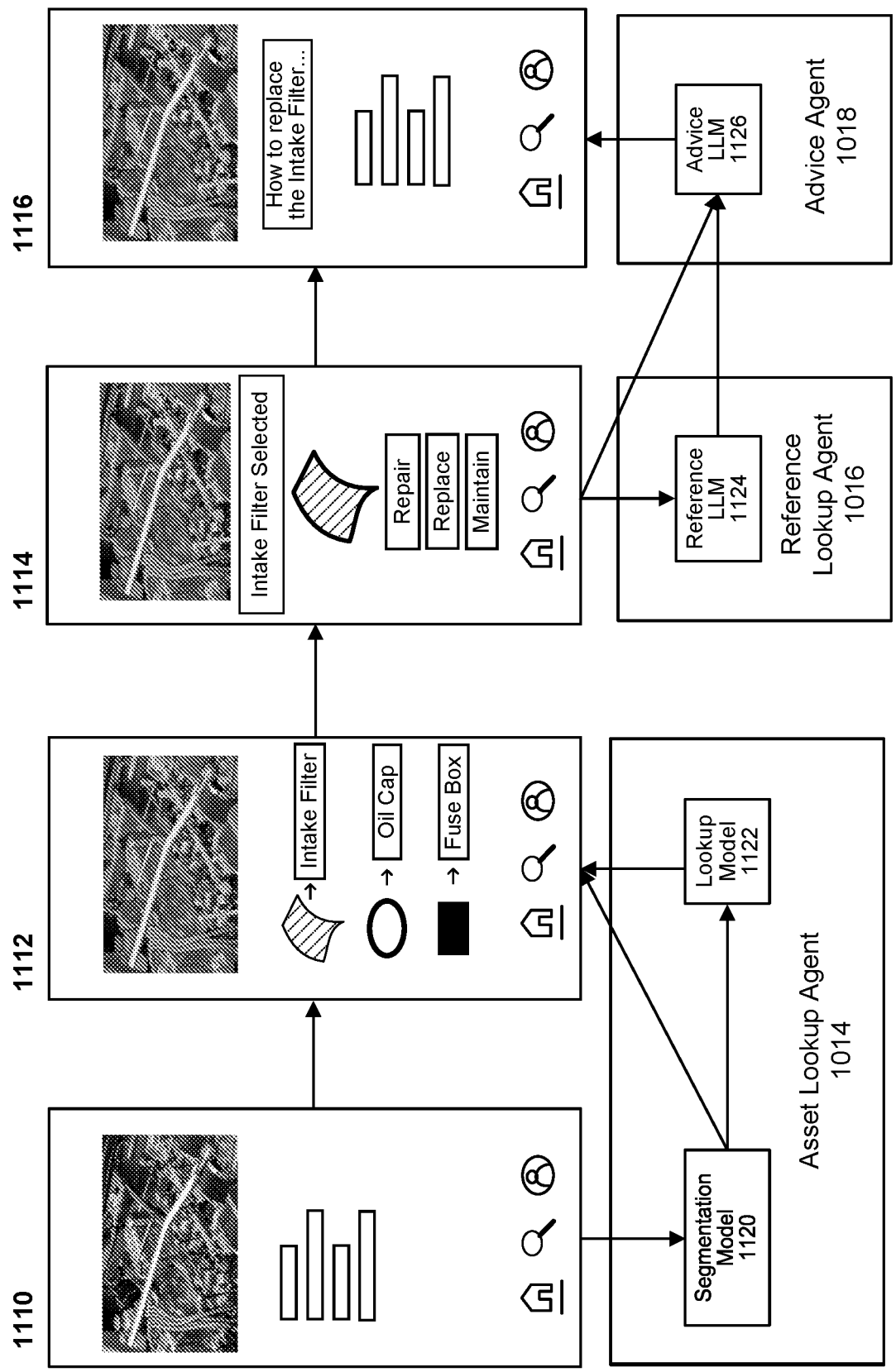
FIG. 11 is an exemplary system illustration, according to an embodiment of the present invention.

FIG. 11 is an exemplary system illustration, according to an embodiment of the present invention. FIG. 11 illustrates a user interface flow for an exemplary use case.

As shown by 1110, a user may capture an image or video frame of an asset the user is working on. In this example, a vehicle engine is shown. Here, a technician may review an initial image of an asset and identify components of the asset. The image may be sent to a system's backend Asset Lookup Agent 1014, where a Segmentation Model 1120 identifies one or more objects within the asset shown by 1110. Each object may feed into a Lookup Model 1122 that uses one or more image similarity measures against the system's internal database of asset componentry to identify the asset's constituent components. According to another example, a multimodal large language model may perform the lookup against the system's internal database of asset componentry. For example, Lookup Model 1122 identifies each component by a corresponding identifier to further retrieve component specifics including name, make, model, etc.

As shown in 1112, the user may be presented with an original image and a superimposed masking that identifies each of the constituent components. Each individual component may then be separately detailed, providing the user an option to click (or otherwise interact) on an individual component, such as the intake filter, oil cap, fuse box, etc. For example, as the user moves a cursor around the original image, individual components may be highlighted. Other user interactions and selection options may be supported.

As shown in 1114, the user may be presented with the selected component. Here, the user has selected an Intake Filter. In addition, prompts may be provided to identify user action and follow-up. For example, the user may want to repair, replace, maintain and/or perform other actions. The available actions may be customized for the selected component. In the backend Reference Lookup Agent 1016, a large language model may be prompted to identify and retrieve reference materials for the identified component as well as other related componentry, information, resources, etc. Reference LLM 1124 may then identify reference data for the component and other related information, e.g., manuals, videos, prior technician comments/experience, images, tutorials, notices, content, etc.

Once the user selects an action with the selected component (e.g., repair, replace, maintain, etc.), the action may be coupled with the reference material in the backend as a prompt to a separate large language model 1126 in Advice Agent 1018. This model may generate content providing instructions, e.g., step-by-step instructions, for a particular task, such as replacing the air filter. In addition, the instructions may include a list of tools, estimated time, and/or other resources and information. The system may look up the availability of the tools within an Inventory Management System. An embodiment of the present invention may identify whether the tools are currently available, in-stock or accessible within a period of time. Other considerations may involve cost, time, warehouse space, technician expertise and/or other resources. In addition, the system may provide recommendations on tools that may be used in place of those that are out of stock or otherwise not available.

An embodiment of the present invention may seek to optimize an overall process through forecasting and integration capabilities.

An embodiment of the present invention may be directed to optimization based on various factors including inventory, technician availability, maintenance timeframe, space limitations, tool inventory, scheduling, etc. For example, an embodiment of the present invention may recognize that a number of machinery (e.g., tanks) are due for maintenance within a window of time and schedule servicing based on parts/tools availability, technician schedules, space within the warehouse, etc.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The foregoing descriptions provide examples of different configurations and features of embodiments of the invention. While certain nomenclature and types of applications/hardware are described, other names and application/hardware usage is possible, and the nomenclature is provided by way of non-limiting examples only. Further, while particular embodiments are described, it should be appreciated that the features and functions of each embodiment may be combined in any combination as is within the capability of one skilled in the art. The figures provide additional exemplary details regarding the various embodiments.

Various exemplary methods are provided by way of example herein. The methods described can be executed or otherwise performed by one or a combination of various systems and modules.

The use of the term computer system in the present disclosure can relate to a single computer or multiple computers. In various embodiments, the multiple computers can be networked. The networking can be any type of network, including, but not limited to, wired and wireless networks, a local-area network, a wide-area network, and the Internet.

According to exemplary embodiments, the System software may be implemented as one or more computer program products, for example, one or more modules of computer program instructions encoded on a computer-readable medium for execution by, or to control the operation of, data processing apparatus. The implementations can include single or distributed processing of algorithms. The computer-readable medium can be a machine-readable storage device, a machine-readable storage substrate, a memory device, or a combination of one or more them. The term "processor" encompasses all apparatus, devices, and machines for processing data, including by way of example a programmable processor, a computer, or multiple processors or computers. The apparatus can include, in addition to hardware, software code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

A computer may encompass all apparatus, devices, and machines for processing data, including by way of example a programmable processor, a computer, or multiple processors or computers. It can include, in addition to hardware, code that creates an execution environment for the computer program in question, e.g., code that constitutes processor firmware, a protocol stack, a database management system, an operating system, or a combination of one or more of them.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computer-readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the embodiments have been particularly shown and described within the framework for conducting analysis, it will be appreciated that variations and modifications may be affected by a person skilled in the art without departing from the scope of the various embodiments. Furthermore, one skilled in the art will recognize that such processes and systems do not need to be restricted to the specific embodiments described herein. Other embodiments, combinations of the present embodiments, and uses and advantages of the will be apparent to those skilled in the art from consideration of the specification and practice of the embodiments disclosed herein. The specification and examples should be considered exemplary.

What is claimed is:

1. A computer-implemented system for providing a conversational assistant using multimodal large language models and image segmentation, the system comprising:
   an interactive user interface that is configured to receive one or more inputs;
   a database interface that communicates with a database that stores and manages asset data; and
   a processor executing on a mobile device and coupled to the interface and the database interface, the processor further configured to perform the steps of:
      receiving, via the interactive user interface, a user query and a scan of an image associated with an asset;
      detecting, via a computer vision detection model, a text from the scan wherein the text is imprinted on the asset and the asset is a customized asset without a conventional serial number;
      performing, via a prediction model, text recognition of the text and identifying one or more predicted texts with corresponding confidence levels;
      displaying, via the interactive user interface executing on the mobile device, the one or more predicted texts comprising an asset identifier;
      identifying, via an asset lookup agent applying a segmentation model, a plurality of objects associated with the asset identifier wherein each object of the plurality of objects is fed to a lookup model to identify each object against an internal asset database;
      for a selected object, identifying, via the interactive user interface, a corresponding service action;
      retrieving, via a reference lookup agent, a set of reference data associated with the selected object;

based on the identified service action and the selected object, generating, via an advice agent, a set of instructions and corresponding set of tools; and providing, via the interactive user interface, a response to the user query wherein the response comprises the set of instructions and the corresponding set of tools.

2. The system of claim 1, wherein the asset lookup agent relies on pre-processing of the user query for consistency in one or more agent prompts.

3. The system of claim 1, wherein the corresponding service action comprises: repair, replace and maintenance.

4. The system of claim 1, wherein the set of reference data comprises one or more documents from a document database that communicates with a client inventory management system via an integration API.

5. The system of claim 1, wherein the set of reference data comprises instructional information that relate directly and indirectly to the asset.

6. The system of claim 1, wherein the response comprises an estimated time required for the identified service action.

7. The system of claim 1, wherein the set of instructions comprises multimedia content comprising a combination of: audio, video, images and text.

8. The system of claim 1, wherein the response comprises an inventory status for at least one tool of the corresponding set of tools.

9. The system of claim 1, wherein at least one of the asset lookup agent, the reference lookup agent and the advice agent applies a multimodal large language model.

10. The system of claim 1, wherein the asset comprises military machinery.

11. A computer-implemented method for providing a conversational assistant using multimodal large language models and image segmentation, the method comprising the steps of:

receiving, via an interactive user interface, a user query and a scan of an image associated with an asset;

detecting, via a computer vision detection model, a text from the scan wherein the text is imprinted on the asset and the asset is a customized asset without a conventional serial number;

performing, via a prediction model, text recognition of the text and identifying one or more predicted texts with corresponding confidence levels;

displaying, via the interactive user interface executing on the mobile device, the one or more predicted texts comprising an asset identifier;

identifying, via an asset lookup agent applying a segmentation model, a plurality of objects associated with the asset identifier wherein each object of the plurality of objects is fed to a lookup model to identify each object against an internal asset database;

for a selected object, identifying, via the interactive user interface, a corresponding service action;

retrieving, via a reference lookup agent, a set of reference data associated with the selected object;

based on the identified service action and the selected object, generating, via an advice agent, a set of instructions and corresponding set of tools; and providing, via the interactive user interface, a response to the user query wherein the response comprises the set of instructions and the corresponding set of tools.

12. The method of claim 11, wherein the asset lookup agent relies on pre-processing of the user query for consistency in one or more agent prompts.

13. The method of claim 11, wherein the corresponding service action comprises: repair, replace and maintenance.

14. The method of claim 11, wherein the set of reference data comprises one or more documents from a document database that communicates with a client inventory management system via an integration API.

15. The method of claim 11, wherein the set of reference data comprises instructional information that relate directly and indirectly to the asset.

16. The method of claim 11, wherein the response comprises an estimated time required for the identified service action.

17. The method of claim 11, wherein the set of instructions comprises multimedia content comprising a combination of: audio, video, images and text.

18. The method of claim 11, wherein the response comprises an inventory status for at least one tool of the corresponding set of tools.

19. The method of claim 11, wherein at least one of the asset lookup agent, the reference lookup agent and the advice agent applies a multimodal large language model.

20. The method of claim 11, wherein the asset comprises military machinery.

* * * * *